United States Patent
Armstrong et al.

(10) Patent No.: US 11,172,325 B1
(45) Date of Patent: Nov. 9, 2021

(54) METHOD AND SYSTEM FOR LOCATION MEASUREMENT ANALYSIS

(71) Applicant: Compology, Inc., San Francisco, CA (US)

(72) Inventors: Justin Armstrong, San Francisco, CA (US); Tyler Benjamin, San Francisco, CA (US)

(73) Assignee: Compology, Inc., San Francisco, CA (US)

( * ) Notice: Subject to any disclaimer, the term of this patent is extended or adjusted under 35 U.S.C. 154(b) by 0 days.

(21) Appl. No.: 16/863,609

(22) Filed: Apr. 30, 2020

Related U.S. Application Data

(60) Provisional application No. 62/841,447, filed on May 1, 2019.

(51) Int. Cl.
| | |
|---|---|
| *H04W 4/021* | (2018.01) |
| *H04W 4/029* | (2018.01) |
| *H04W 24/10* | (2009.01) |
| *H04L 29/08* | (2006.01) |
| *H04W 4/02* | (2018.01) |

(52) U.S. Cl.
CPC ............ *H04W 4/021* (2013.01); *H04L 67/18* (2013.01); *H04W 4/023* (2013.01); *H04W 4/029* (2018.02); *H04W 24/10* (2013.01)

(58) Field of Classification Search
CPC ..... H04W 4/021; H04W 4/029; H04W 4/022; H04W 4/027; H04W 4/70; H04W 24/08; H04W 4/02; H04W 12/00503; H04L 67/18; G06Q 30/0261; G08B 13/19621; G01S 19/42
See application file for complete search history.

(56) References Cited

U.S. PATENT DOCUMENTS

| | | | |
|---|---|---|---|
| 4,485,831 | A | 12/1984 | Ungerleider |
| 4,646,793 | A | 3/1987 | Sherratt |
| 5,257,577 | A | 11/1993 | Clark |
| 5,299,493 | A | 4/1994 | Durbin et al. |
| 5,609,193 | A | 3/1997 | Steckler |

(Continued)

FOREIGN PATENT DOCUMENTS

| | | |
|---|---|---|
| CN | 101482742 B | 8/2011 |
| EP | 2284104 A1 | 2/2011 |

(Continued)

OTHER PUBLICATIONS

Vicentini et al. Sensorized waste collection container for content estimation and collection optimization. Waste Management 29 (2009) [retrieved on Oct. 29, 2014], Retrieved from the Internet: pp. 1467-1472.

(Continued)

*Primary Examiner* — Allahyar Kasraian
(74) *Attorney, Agent, or Firm* — Jeffrey Schox; Samuel Rosenthal

(57) ABSTRACT

A method for location measurement analysis, preferably including associating a location measurement with a geofence by receiving a location measurement, selecting candidate geofences, determining features, and/or classifying the location. A system for location measurement analysis, preferably including a computing system, and optionally including one or more containers and/or one or more location sensors associated with each container.

18 Claims, 8 Drawing Sheets

(56) References Cited

U.S. PATENT DOCUMENTS

| | | |
|---|---|---|
| 5,708,424 A | 1/1998 | Orlando et al. |
| 5,812,060 A | 9/1998 | Despain et al. |
| 5,927,142 A | 7/1999 | Mercer |
| 5,964,258 A | 10/1999 | Schoenbauer |
| 6,123,017 A | 9/2000 | Little et al. |
| 6,125,213 A | 9/2000 | Morimoto |
| 6,369,715 B2 | 4/2002 | Bennett et al. |
| 6,561,085 B1 | 5/2003 | Durbin et al. |
| 6,822,565 B2 | 11/2004 | Thomas et al. |
| 6,951,615 B2 | 10/2005 | Tripodi et al. |
| 7,032,820 B2 | 4/2006 | Kreiner et al. |
| 7,313,464 B1 | 12/2007 | Perreault et al. |
| 7,421,112 B2 | 9/2008 | Calver et al. |
| 7,423,541 B2 | 9/2008 | Miller |
| 7,441,569 B2 | 10/2008 | Lease |
| 7,728,730 B2 | 6/2010 | Langlois et al. |
| 7,853,142 B2 | 12/2010 | Meyers et al. |
| 7,999,688 B2 | 8/2011 | Healey et al. |
| 8,185,277 B2 | 5/2012 | Flood et al. |
| 8,339,269 B2 | 12/2012 | Sherron |
| 8,565,536 B2 | 10/2013 | Liu |
| 8,620,393 B2 | 12/2013 | Bornstein et al. |
| 9,301,094 B2 | 3/2016 | Jajoo et al. |
| 9,352,887 B2 | 5/2016 | Poss et al. |
| 9,952,600 B2 | 4/2018 | Gurin |
| 10,064,007 B1 | 8/2018 | Deluca et al. |
| 10,405,133 B1 | 9/2019 | Merjanian et al. |
| 10,416,311 B2 | 9/2019 | Huang et al. |
| 10,559,208 B1 | 2/2020 | Mcalpine et al. |
| 10,621,873 B1 | 4/2020 | Spiel et al. |
| 10,798,522 B1 * | 10/2020 | Benjamin ............ G06Q 10/087 |
| 2002/0108507 A1 | 8/2002 | May et al. |
| 2004/0129781 A1 | 7/2004 | Kreiner et al. |
| 2004/0199401 A1 | 10/2004 | Wagner et al. |
| 2005/0080520 A1 | 4/2005 | Kline et al. |
| 2005/0083197 A1 | 4/2005 | Glenn et al. |
| 2005/0126958 A1 | 6/2005 | Bohlig et al. |
| 2006/0196937 A1 | 9/2006 | Kreiner et al. |
| 2006/0261964 A1 | 11/2006 | Maetzke |
| 2007/0133980 A1 | 6/2007 | Meyers et al. |
| 2007/0260466 A1 | 11/2007 | Casella et al. |
| 2008/0061125 A1 | 3/2008 | Langlois et al. |
| 2008/0061977 A1 | 3/2008 | Maruca et al. |
| 2009/0014363 A1 | 1/2009 | Gonen et al. |
| 2009/0161907 A1 | 6/2009 | Healey et al. |
| 2009/0321511 A1 | 12/2009 | Browne |
| 2010/0001867 A1 | 1/2010 | Rodrigue et al. |
| 2010/0017127 A1 | 1/2010 | Pepitone et al. |
| 2010/0042940 A1 | 2/2010 | Monday et al. |
| 2010/0069035 A1 | 3/2010 | Johnson |
| 2010/0092089 A1 | 4/2010 | Wilson et al. |
| 2010/0217715 A1 | 8/2010 | Lipcon |
| 2010/0287073 A1 | 11/2010 | Kocis et al. |
| 2010/0312601 A1 | 12/2010 | Lin |
| 2011/0000295 A1 | 1/2011 | Kritlow |
| 2011/0054979 A1 * | 3/2011 | Cova .................... G06Q 10/06 705/7.37 |
| 2011/0137812 A1 | 6/2011 | Sherga |
| 2011/0148634 A1 | 6/2011 | Putz |
| 2011/0175739 A1 | 7/2011 | Mcfeeters |
| 2012/0010746 A1 | 1/2012 | Sundholm |
| 2012/0192646 A1 | 8/2012 | Arnold et al. |
| 2012/0209783 A1 | 8/2012 | Smith et al. |
| 2012/0314059 A1 | 12/2012 | Hoffmann et al. |
| 2013/0006522 A1 | 1/2013 | Vellaikal et al. |
| 2013/0096731 A1 | 4/2013 | Tamari et al. |
| 2013/0180892 A1 | 7/2013 | Marrapodi et al. |
| 2013/0278067 A1 | 10/2013 | Poss et al. |
| 2013/0295970 A1 | 11/2013 | Sheshadri et al. |
| 2013/0345969 A1 * | 12/2013 | Udeshi .................. G01C 21/30 701/461 |
| 2014/0005039 A1 | 1/2014 | Ohishi et al. |
| 2014/0050397 A1 | 2/2014 | Badholm et al. |
| 2014/0074298 A1 | 3/2014 | Jambeck et al. |
| 2014/0214697 A1 | 7/2014 | Mcsweeney |
| 2014/0229501 A1 | 8/2014 | Josefiak |
| 2014/0266698 A1 | 9/2014 | Hall et al. |
| 2014/0351328 A1 | 11/2014 | Woods et al. |
| 2015/0081212 A1 | 3/2015 | Mitchell et al. |
| 2015/0088792 A1 | 3/2015 | O'Neill et al. |
| 2015/0148077 A1 | 5/2015 | Jelle |
| 2015/0186497 A1 | 7/2015 | Patton et al. |
| 2015/0271126 A1 | 9/2015 | Menayas et al. |
| 2015/0271639 A1 | 9/2015 | Ziskind et al. |
| 2015/0310606 A1 | 10/2015 | Shreve et al. |
| 2015/0339864 A1 | 11/2015 | Herron |
| 2015/0348252 A1 | 12/2015 | Mask |
| 2016/0003627 A1 | 1/2016 | Bonhomme |
| 2016/0195602 A1 | 7/2016 | Meadow |
| 2016/0212590 A1 | 7/2016 | Decorte et al. |
| 2016/0266258 A1 | 9/2016 | Huang et al. |
| 2016/0292862 A1 | 10/2016 | Mask |
| 2017/0109027 A1 | 4/2017 | Shubs et al. |
| 2017/0124643 A1 | 5/2017 | Haimi et al. |
| 2017/0223499 A1 * | 8/2017 | Jernigan ............... H04W 4/023 |
| 2017/0289754 A1 | 10/2017 | Anderson et al. |
| 2017/0353829 A1 | 12/2017 | Kumar et al. |
| 2017/0366616 A1 | 12/2017 | Rodrigues Nascimento et al. |
| 2018/0027371 A1 | 1/2018 | Austraat et al. |
| 2018/0075108 A1 | 3/2018 | Park et al. |
| 2018/0082279 A1 | 3/2018 | Vasgaard et al. |
| 2018/0108023 A1 | 4/2018 | Stewart et al. |
| 2018/0165970 A1 | 6/2018 | Namgoong et al. |
| 2018/0174067 A1 * | 6/2018 | Spiro ...................... G06K 9/00 |
| 2018/0189835 A1 | 7/2018 | Deluca et al. |
| 2018/0192237 A1 | 7/2018 | Privitera et al. |
| 2018/0232767 A1 | 8/2018 | Garg et al. |
| 2018/0262903 A1 | 9/2018 | Ryan et al. |
| 2018/0268377 A1 | 9/2018 | Mofardin et al. |
| 2018/0312095 A1 | 11/2018 | Eletrabi |
| 2018/0338001 A1 | 11/2018 | Pereira Cabral et al. |
| 2018/0338031 A1 * | 11/2018 | Subramanian .... H04M 1/72572 |
| 2018/0374046 A1 | 12/2018 | Powers et al. |
| 2019/0007484 A1 | 1/2019 | Chen et al. |
| 2019/0026915 A1 | 1/2019 | Seaman et al. |
| 2019/0102726 A1 | 4/2019 | Ushiki et al. |
| 2019/0164081 A1 | 5/2019 | Deluca et al. |
| 2019/0313204 A1 | 10/2019 | Ayoub et al. |
| 2020/0100052 A1 * | 3/2020 | Ellis ........................ H04L 67/26 |
| 2020/0145783 A1 * | 5/2020 | Hanada ................. H04W 4/029 |
| 2020/0162842 A1 | 5/2020 | Jones |
| 2020/0252742 A1 | 8/2020 | Yeon et al. |
| 2020/0344567 A1 | 10/2020 | Wirola et al. |
| 2021/0006936 A1 * | 1/2021 | Wirola ................... H04W 4/021 |

FOREIGN PATENT DOCUMENTS

| | | |
|---|---|---|
| GB | 2386686 A | 9/2003 |
| WO | 2012015664 A1 | 2/2012 |
| WO | 2012164098 A1 | 12/2012 |
| WO | 2014079586 A1 | 5/2014 |

OTHER PUBLICATIONS

Gates, Jason, "Fullness Monitoring for Waste- Image-based vs. Ultrasonic Sensors", https://medium.com/@compology/fullness-monitoring-for-waste-image-based-vs-ultrasonic-sensors-29f360bf01e8, dated Jul. 11, 2017.

Karpathy, Andrej, "CS231n Convolutional Neural Networks for Visual Recognition", http://cs231n.github.io/neural-networks-2/#losses.

Lamba, Marshall, "One Shot Learning with Siamese Networks using Keras", https://towardsdatascience.com/one-shot-learning-with-siamese-networks-using-keras-17f34e75bb3d, dated Jan. 20, 2019.

* cited by examiner

METHOD AND SYSTEM FOR LOCATION MEASUREMENT ANALYSIS

CROSS-REFERENCE TO RELATED APPLICATIONS

This application claims the benefit of U.S. Provisional Application Ser. No. 62/841,447, filed on 1 May 2019, which is incorporated in its entirety by this reference.

TECHNICAL FIELD

This invention relates generally to the location measurement field, and more specifically to a new and useful method and system for location measurement analysis in the location measurement field.

BACKGROUND

Typical methods and systems for location measurement analysis require location data with reliably high accuracy and/or precision, and/or require additional metadata, to enable determination of useful and/or reliable information. Accordingly, such methods and systems may not be able to rely on location data of low or inconsistent accuracy and/or precision, such as some data received from geopositioning systems. Further, some methods and systems for location measurement analysis may rely (in part or in whole) on information received from users, such as information regarding geofence positions, shapes, and/or sizes, but may not be able to adequately reconcile such information with some or all received location data (e.g., location data of low or inconsistent accuracy and/or precision). Thus, there is a need in the location measurement field to create a new and useful method and system for location measurement analysis.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

A method 10 for location measurement analysis preferably includes associating a location measurement with a geofence S100. The method 10 can optionally include training a classifier S200 and/or any other suitable elements.

Figure 1:
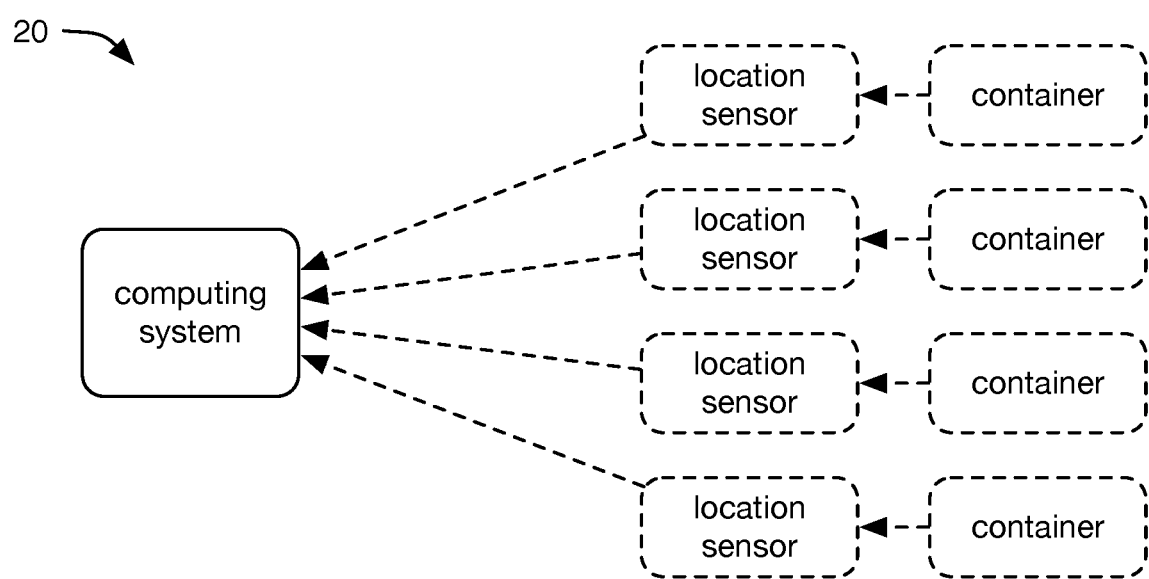
FIG. 1 is a schematic representation of an embodiment of the system.

A container management system 20 preferably includes a computing system (e.g., remote server), and can additionally or alternatively include one or more containers, one or more location sensors associated with each container, and/or any other suitable elements (e.g., as shown in FIG. 1).

The method is preferably performed using the system 20, but can additionally or alternatively be performed by any other suitable system.

2. System.

The containers can include dumpsters (e.g., front load containers, roll off containers, etc.), shipping containers (e.g., intermodal freight containers, unit load devices, etc.), sections of a vehicle (e.g., land, sea, air, and/or space vehicle) such as vehicle cargo holds, rooms of a structure (e.g., a fixed structure such as a building), and/or any other suitable containers.

Each container is preferably associated with one or more location sensors (e.g., GNSS and/or other geopositioning modules, such as receivers for one or more of GPS, GLONASS, BeiDou, Galileo, etc.; local positioning modules, such as modules enabling techniques such as triangulation, trilateration, multilateration, etc.), preferably location sensors configured to determine the location (e.g., geospatial position) of the container. The location sensor is preferably affixed to the container, but can additionally or alternatively have any other suitable arrangement with respect to the container.

Figure 2A:
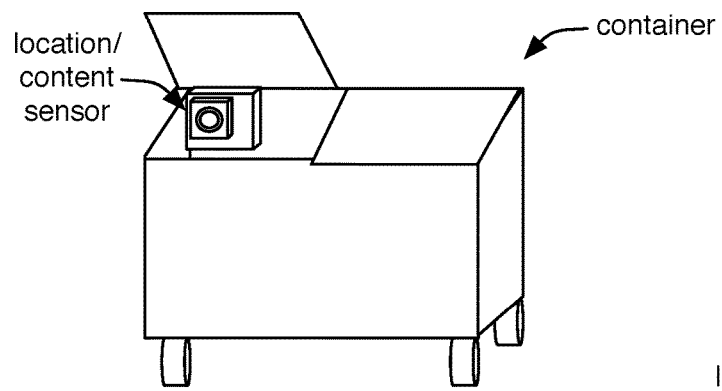
FIGS. 2A-2C are schematic representations of various examples of one or more location sensors coupled to a container.
Figure 2B:
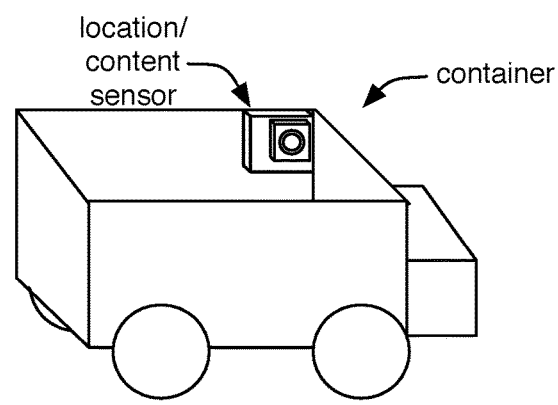
Figure 2C:
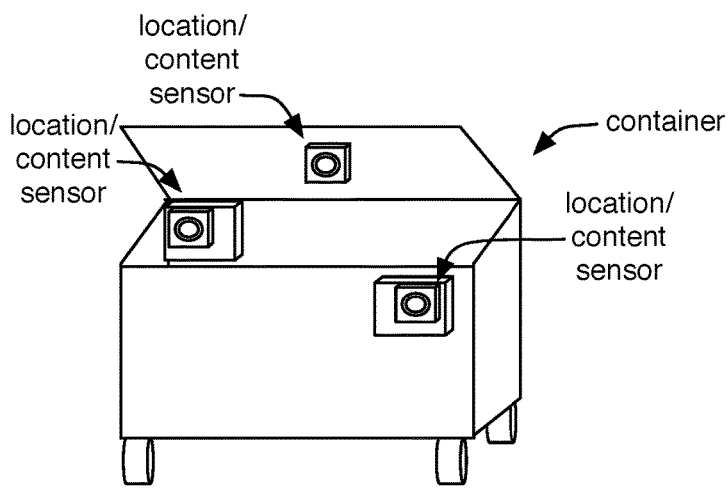

Each container can optionally include one or more content sensors (e.g., integrated with and/or separate from the location sensor). The content sensor is preferably configured to sense (e.g., image) the interior of the container that it is associated with (e.g., image and/or otherwise sense the contents of the container), more preferably configured to sense substantially all of the interior but alternatively configured to image any suitable portion thereof. The content sensor preferably has a fixed position and/or orientation relative to the container (e.g., is mechanically coupled to the container, preferably by a fixed coupling) but can alternatively have any other suitable spatial relationship with respect to the container (e.g., as shown in FIGS. 2A-2C).

The content sensor preferably includes one or more imaging devices. The imaging device is preferably an optical sensor (e.g., camera), but can additionally or alternatively include an ultrasound imaging device and/or any other suitable imaging devices. Examples of optical sensors include a monocular camera, stereocamera, multi-lens or multi-view camera, color camera (e.g., an RGB camera) such as a charge coupled device (CCD) or a camera including a CMOS sensor, grayscale camera, multispectral camera (narrow band or wide band), hyperspectral camera, ultraspectral camera, spectral camera, spectrometer, time of flight camera, high-, standard-, or low-dynamic range cameras, range imaging system (e.g., LIDAR system), active light system (e.g., wherein a light, such as an IR LED, is pulsed and directed at the subject and the reflectance difference measured by a sensor, such as an IR sensor), thermal sensor, infra-red imaging sensor, projected light system, full spectrum sensor, high dynamic range sensor, or any other suitable imaging system. The optical sensor is preferably configured to capture a 2-dimensional or 3-dimensional image, but can alternatively capture any measurement having any other suitable dimension. The image is preferably single, multi-pixel, time-averaged or sum total measurement of the intensity of a signal emitted or reflected by objects within a field of view, but can alternatively be a video (e.g., a set of images or frames), or any other suitable measurement. The image preferably has a resolution (e.g., cycles per millimeter, line pairs per millimeter, lines of resolution, contrast vs. cycles/mm, modulus of the OTF, or any other suitable measure) capable of resolving a 1 cm³ object at a sensor distance of at least 10 feet from the object, but can alternatively have a higher or lower resolution.

The content sensor can optionally include one or more emitters that are configured to emit electromagnetic signals, audio signals, compounds, or any other suitable interrogator that the content sensor is configured to measure. However, the content sensor can additionally or alternatively measure signals from the ambient environment. Examples of sensor-emitter pairs include LIDAR systems, time-of-flight systems, ultrasound systems, radar systems, X-ray systems, and/or any other suitable systems. In embodiments in which the content sensor includes an emitter, the content sensor can optionally include a reference sensor that measures the ambient environment signals (e.g., wherein the content sensor measurement can be corrected by the reference sensor measurement).

The content sensor can optionally include a lens that functions to adjust the optical properties of the incident signal on the sensor. For example, the optical sensor can include a fish-eye lens to broaden the area monitored by the optical sensor, wherein the resultant distortion is known and can be adjusted for during image processing. However, the lens can be a wavelength filter, polarizing filter, or any other suitable lens. The content sensor can additionally or alternatively include a physical or digital filter, such as a noise filter that corrects for interferences in the measurement.

The location sensors and/or content sensors can optionally include one or more communication modules. The communication module preferably functions to communicate data from the content sensor to a second system (e.g., the computing system). The data can be measurements from the location sensor (e.g., location measurements), measurements from the content sensor (and/or any other suitable components), processed measurements, instructions, pickup requests, and/or any other suitable data. The second system can be a device, server system, or any other suitable computing system. The second system can be remote or wired to the communication system. Examples of the second system include a mobile device (e.g., smartphone, tablet, computer), server system, or any other suitable computing system. The communication system can be a wireless or wired communication system. The communication system can be a cellular, WiFi, Zigbee, Z-Wave, near-field communication system (e.g., Bluetooth, RF, NFC, etc.), Ethernet, powerline communication, or any other suitable communication system. The communication system is preferably operable in a standby or off mode, wherein the communication system consumes power at a rate less than a threshold rate, and an on or communication mode, wherein the communication system consumes power at a rate required to communicate data. However, the communication system can be operable in any other suitable mode.

The location sensors and/or content sensors can optionally include one or more auxiliary sensors, such as IMU sensors (e.g., accelerometer, gyroscope, magnetometer, etc.), weight sensors, audio sensors, and/or any other suitable auxiliary sensors.

However, the system 20 can additionally or alternatively include any other suitable elements in any suitable arrangement.

3. Method.

3.1 Associating a Location Measurement with a Geofence.

Figure 3:
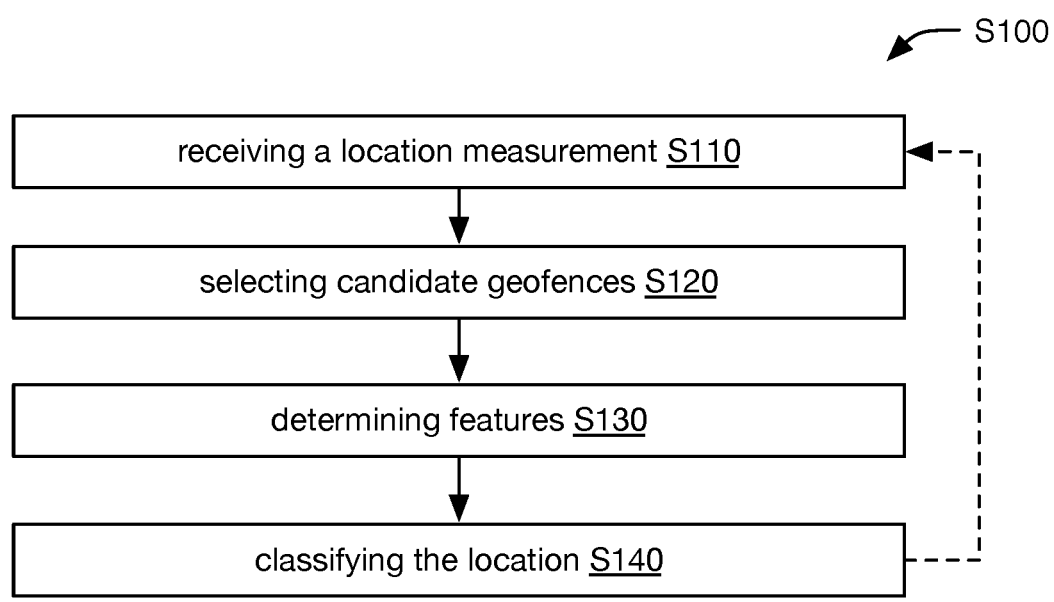
FIG. 3 is a flowchart representation of an embodiment of a first element of the method.

Associating a location measurement with a geofence S100 preferably functions to assign a location measurement to a nearby geofence. S100 preferably includes: receiving a location measurement S110; selecting candidate geofences S120; determining features S130; and/or classifying the location S140 (e.g., as shown in FIG. 3). However, S100 can additionally or alternatively include any other suitable elements performed in any suitable manner.

S100 is preferably performed in response to receiving the location measurement (e.g., automatically performed in response, performed immediately in response, etc.). However, S100 can additionally or alternatively be performed periodically, sporadically, in response to any other suitable trigger, and/or with any other suitable timing. For example, each time S100 is performed, it can be performed for each location measurement received (e.g., by the computing system performing S100) since the previous performance of S100. However, S100 can additionally or alternatively be performed with any other suitable timing for any other suitable location measurement or measurements.

3.1.1 Receiving a Location Measurement.

Receiving a location measurement S110 preferably functions to provide a location measurement to be assigned to a geofence. The location measurement is preferably received from a location sensor, such as a location sensor associated with a container of the system. The location measurement is preferably associated with a location (e.g., geospatial position such as latitude, longitude, and/or elevation). For example, S110 can include receiving a GPS post (e.g., from a GPS receiver associated with a container of the system). However, S110 can additionally or alternatively include receiving one or more location measurements in any other suitable manner.

3.1.2 Selecting Candidate Geofences.

Selecting candidate geofences S120 preferably functions to select one or more geofences that may be associated with the location. The geofences are preferably selected from a set of geofences defined in a region (e.g., a municipal region, a container service area, etc.). The set of geofences (and/or the subset selected in S120) can include user-defined geofences, automatically determined geofences (e.g., geofences determined based on a set of location measurements), and/or any other suitable geofences.

Figure 4A:
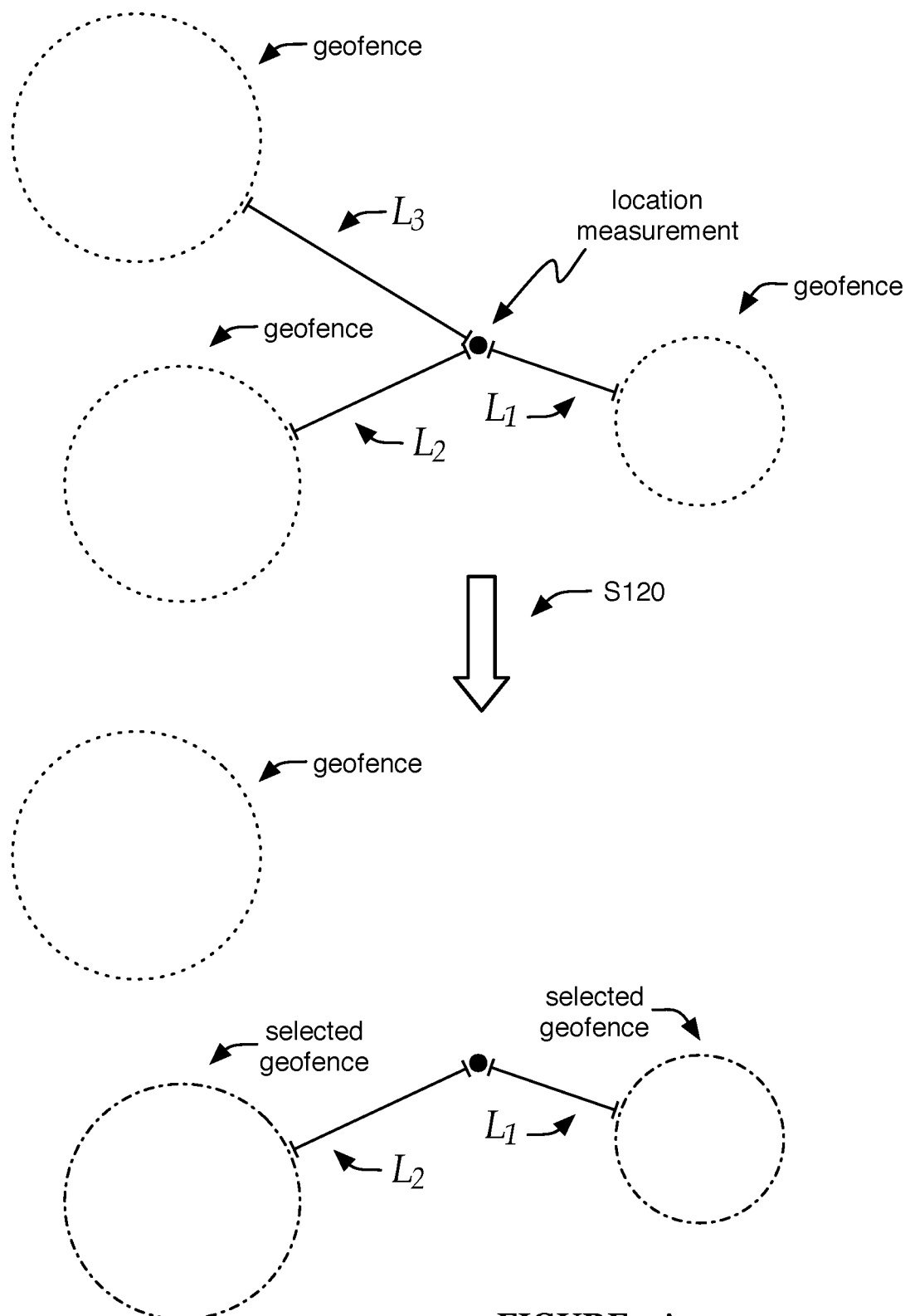
FIGS. 4A-4B are schematic representations of an example of various subelements of the method.

S120 preferably includes selecting geofences close to the location (e.g., the geofences closest to the location). Geofence proximity is preferably determined based on the shortest distance between the location and an edge of each geofence ("edge distance"). The edge distance associated with a location inside a geofence is preferably considered to be negative, such that a first location inside a geofence is considered to have a shorter edge distance than a second location outside the geofence, even if the absolute value of the first location's edge distance is greater than the second location's. Alternatively, the proximity can be determined based on a distance between the location and the center of each geofence ("center distance"), and/or based on any other suitable proximity metric. In a first variation, S120 includes selecting all geofences within a threshold distance (e.g., 0.1, 0.2, 0.5, 1, 2, 3, 5, 10, 0.1-0.5, 0.5-2, or 2-10 km, etc.) of the location. In a second variation, S120 includes selecting a predetermined number of geofences (e.g., 1, 2, 3, 4, 5, 6-10, etc.), preferably by selecting the closest geofences (e.g., the 2 closest geofences, such as shown by way of example in FIG. 4A, wherein $L_1$, $L_2$, and $L_3$ represent the edge distance to the first, second, and third closest geofences, respectively). However, S120 can additionally or alternatively include selecting any other suitable geofences in any suitable manner.

3.1.3 Determining Features.

Figure 4B:
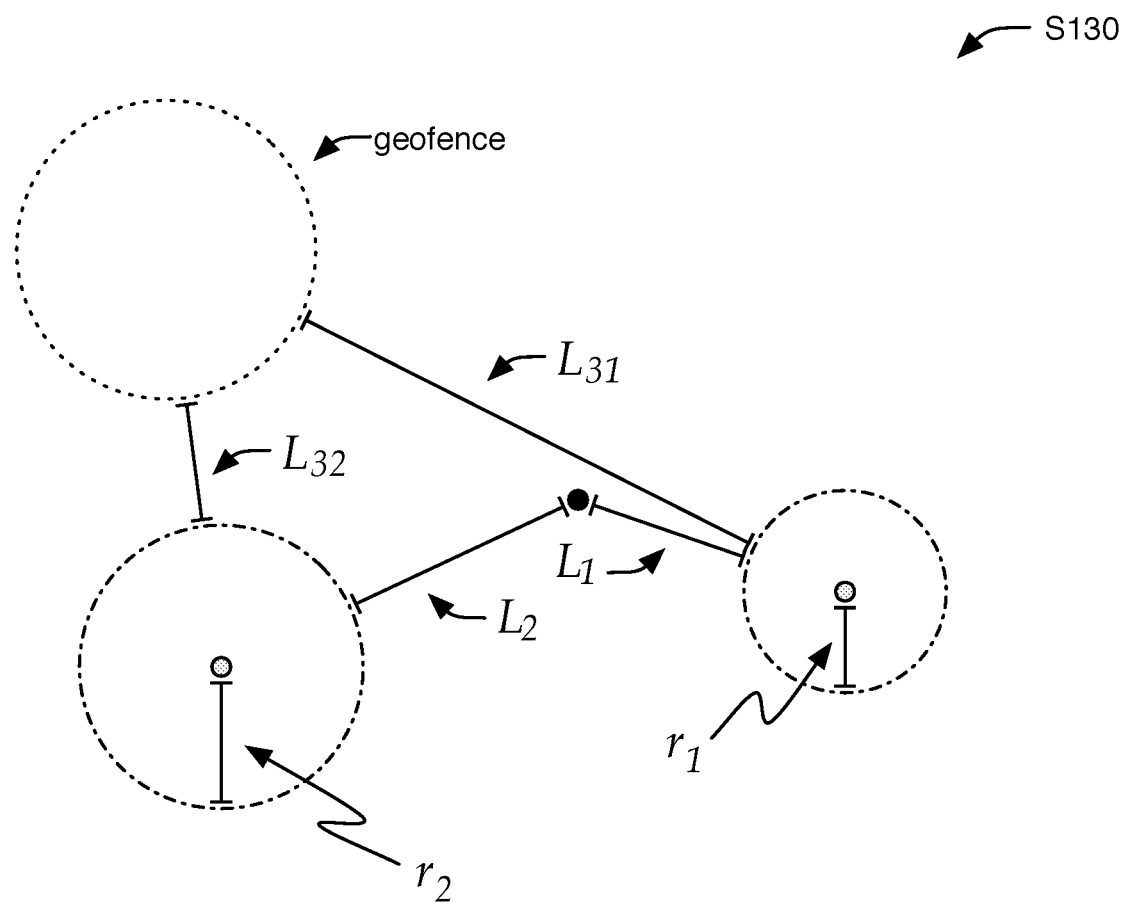

Determining features S130 preferably functions to determine one or more features to be used by a classifier. Such features can include, for example, one or more geofence features associated with each candidate geofence. The geofence features can include size (e.g., length scale such as radius, width, perimeter, convex hull perimeter, etc.; area; convex hull area; etc.), center and/or edge distance to the location, one or more distances to other geofences (e.g., other candidate geofences, geofences not selected as candidate geofences, etc.), sizes (e.g., length scale such as radius, width, perimeter, convex hull perimeter, etc.; area; convex hull area; etc.) of other geofences (e.g., other candidate geofences, geofences not selected as candidate geofences, etc.), and/or any other suitable features associated with one or more geofences (e.g., as shown in FIG. 4B).

In a first example, the distance to other candidate geofences is defined as the shortest distance between geofence edges ("edge-edge distance"). In a second example, the distance is defined as the distance between geofence centers ("center-center distance"). The other geofences to which the distances are defined can include: the closest geofence or non-candidate geofence to the geofence under consideration, the non-candidate geofence with the shortest average distance to each of the candidate geofences, the closest non-candidate geofence to the location, and/or any other suitable geofences. However, the features can additionally or alternatively include any other suitable distances.

The geofence features can additionally or alternatively include derived features (e.g., features determined based on one or more other geofence features, such as the features described above, and/or determined based on any other suitable features). In a first example, the derived features include one or more logarithms, such as logarithms of one or more lengths (e.g., radius, distance, etc.). In a second example, the derived features include one or more ratios (e.g., edge distance divided by radius, ratios between radii of other geofences, etc.). However, the features can additionally or alternatively include any other suitable derived features.

S130 can additionally or alternatively include determining location measurement features, such as measurement uncertainty (e.g., GPS uncertainty, such as uncertainty reported by a GPS receiver), historical location measurements (e.g., previous measurements received from the same location sensor and/or received from another location sensor associated with the first location sensor, such as another location sensor associated with the same container), and/or any other suitable measurement features. However, S130 can additionally or alternatively include determining any other suitable features in any suitable manner.

3.1.4 Classifying the Location.

Classifying the location S140 preferably functions to determine a geofence to associate with the location measurement. S140 is preferably performed using a computerized classifier (e.g., trained such as described below regarding S200). The computerized classifier is preferably a random forest classifier (or variant thereof, such as a kernel random forest classifier). However, the classifier can additionally or alternatively include one or more support vector machines and/or any other suitable classifiers.

The classifier preferably outputs one of the candidate geofences, no candidate geofence, and/or optionally an indication of classification ambiguity (e.g., when the classifier determines that two or more of the candidate geofences may be associated with the location). However, the classifier can additionally or alternatively provide any other suitable outputs.

Figure 5A:
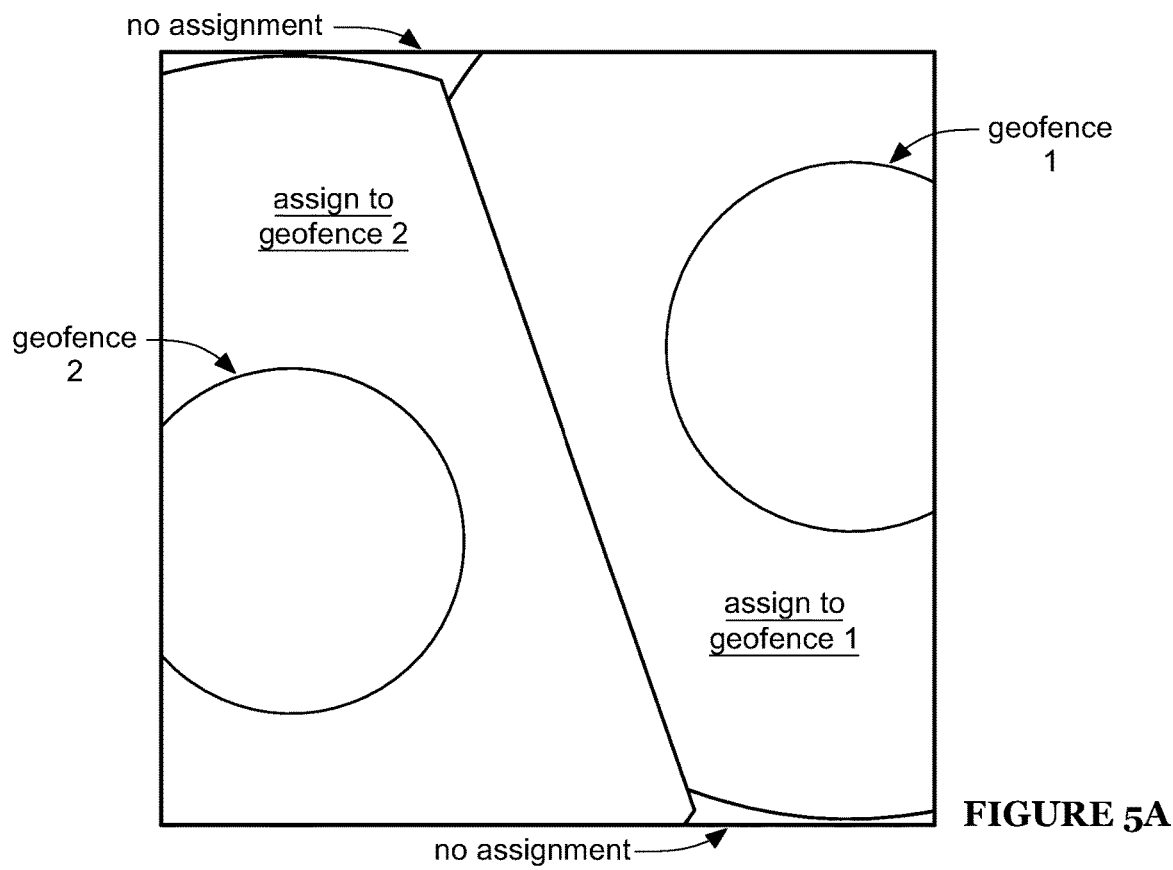
FIGS. 5A-5C are schematic representations of potential results of various specific examples of the method.
Figure 5B:
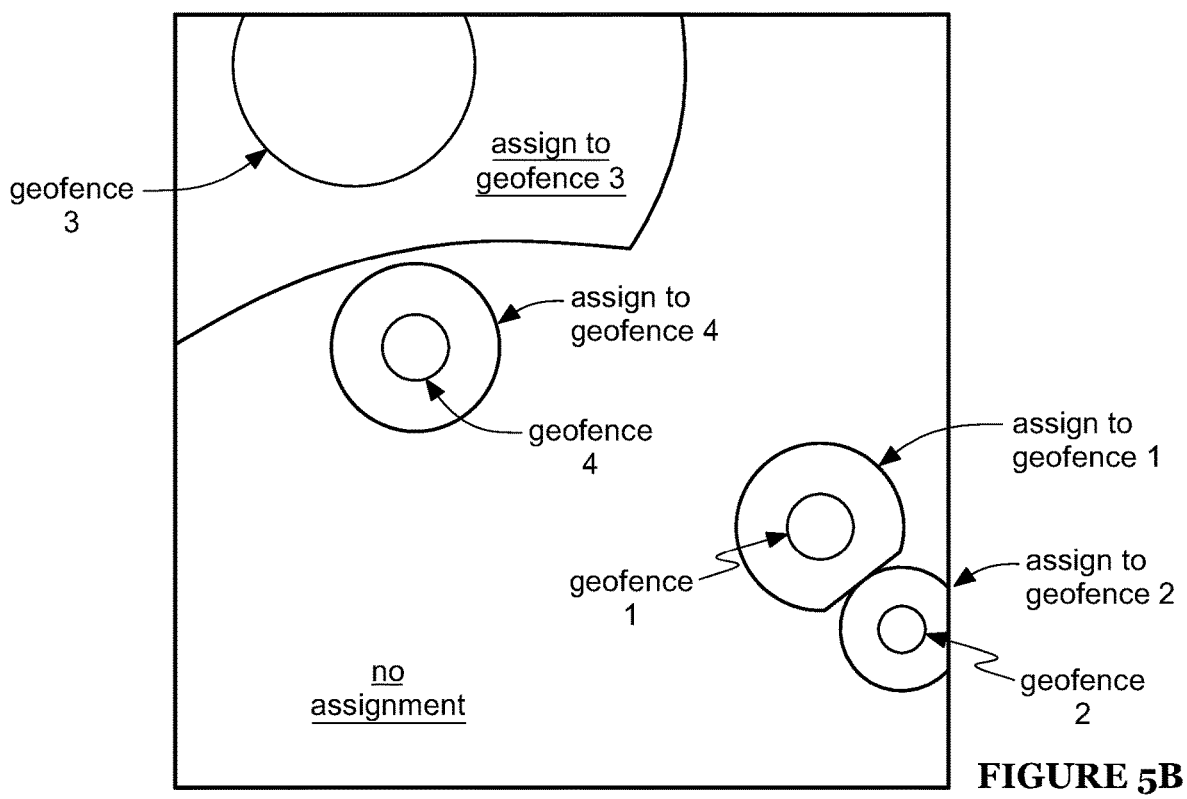
Figure 5C:
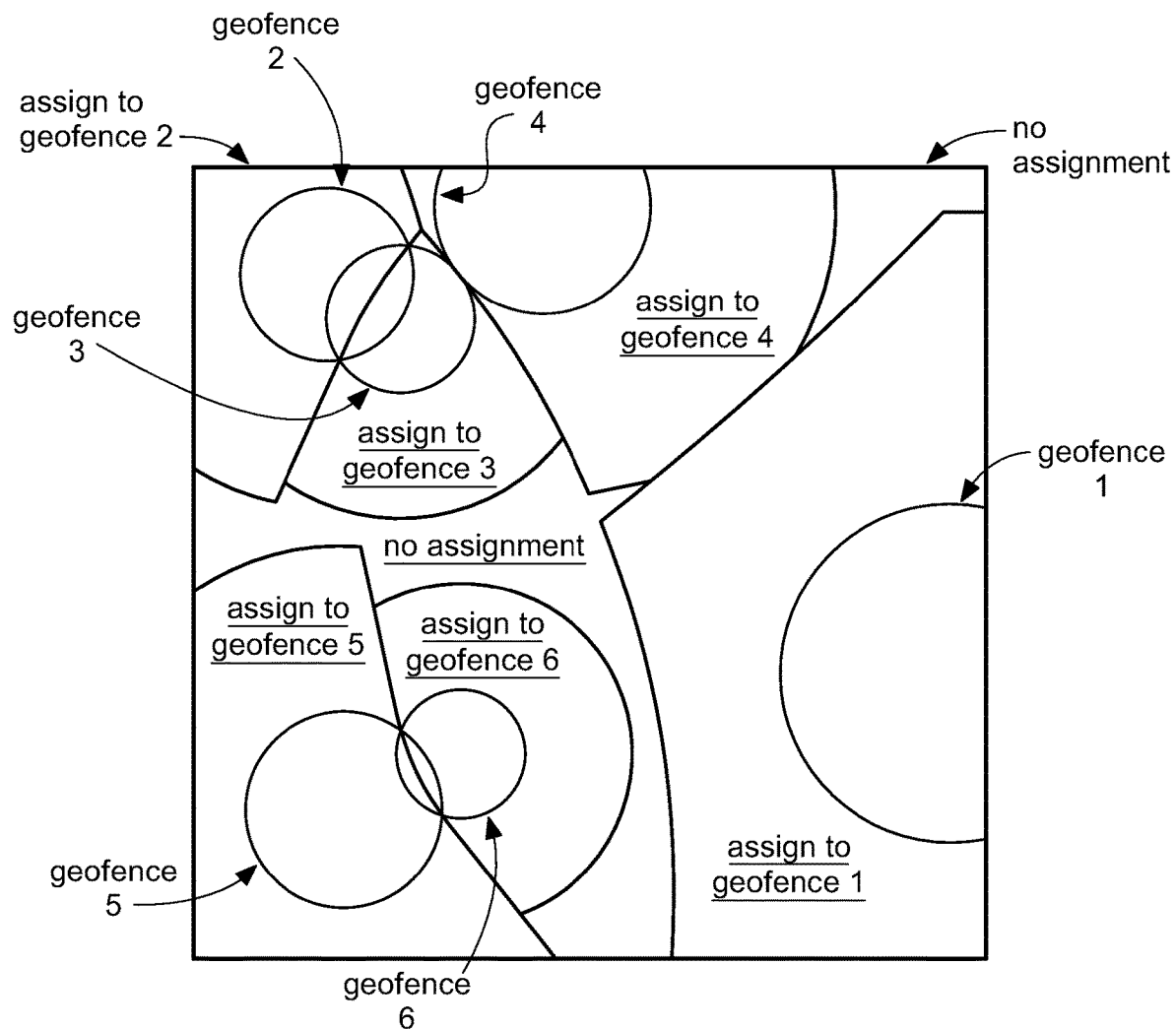

In one example, the classifier results in associations such as shown in FIGS. 5A-5C (e.g., wherein each colored region represents an association with a different geofence, the black regions represent positions in which location measurements would not be associated with any geofence by the classifier, and the outlined circles represent the geofences). However S140 can additionally or alternatively include classifying the location in any other suitable manner.

S100 can additionally or alternatively include any other suitable elements performed in any suitable manner.

3.2 Training the Classifier.

Figure 6:
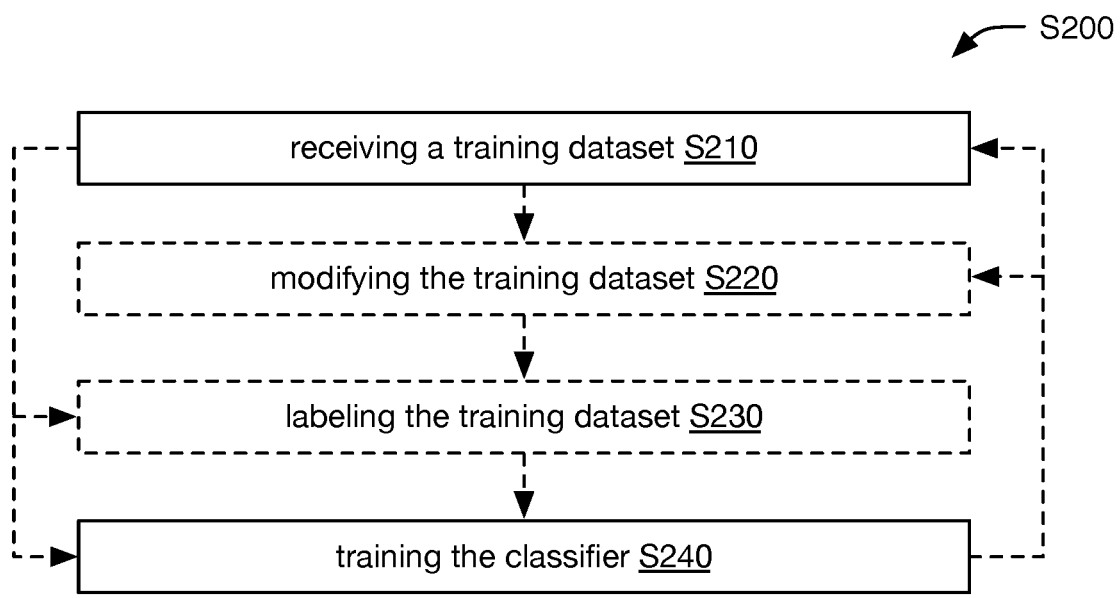
FIG. 6 is a flowchart representation of an embodiment of a second element of the method.

Training the classifier S200 preferably functions to generate a classifier for associating location measurements with geofences. S200 preferably includes receiving a training dataset S210 and/or training the classifier S240 (e.g., as shown in FIG. 6). S200 can optionally include modifying the training dataset S220 and/or labeling the training dataset S230. However S200 can additionally or alternatively include any other suitable elements performed in any suitable manner.

3.2.1 Receiving a Training Dataset.

Receiving a training dataset S210 preferably functions to receive data for training a classifier. The training dataset preferably includes a set of data elements. Each data element preferably includes a location measurement and a set of possible geofences, and can optionally include additional information. The location measurement is preferably in the same form as the location measurements provided in S100, but can additionally or alternatively include any other suitable location measurements and/or purported location measurements (e.g., location data generated for the training dataset rather than measured). The set of possible geofences preferably includes one or more geofences that the location measurement may be associated with (e.g., geofences near the location measurement, all geofences within an area such as a municipality or service area, etc.). Each geofence of the set preferably defines a shape and position (e.g., a radius and a location of the geofence center). The set of geofences (and/or elements thereof) can be shared between multiple location measurements (e.g., all location measurements of the training dataset, a subset thereof, etc.), can differ between location measurements, and/or can be shared or different in any other suitable manner. The possible geofences can be the same as the geofences used in S120, can include geofences from S120 and additional geofences, can differ entirely from the geofences of S120, and/or can include any other suitable geofences.

The additional information can include location measurement features (e.g., as described in S130), associations with users, customers, waste types, and/or any other suitable associations, and/or can include any other suitable information associated with the location measurement, geofences, and/or other aspects of the data elements. However, the data element can additionally or alternatively include any other suitable information.

The dataset (or a subset of the elements thereof) can optionally be labeled. For example, each data element can include one or more of: a geofence association, an indication of no associated geofence, and/or an indication of uncertainty, such as an ambiguous classification.

However S210 can additionally or alternatively include receiving any other suitable information in any other suitable manner.

3.2.2 Modifying the Training Dataset.

Training the classifier S200 can optionally include modifying the training dataset S220. S220 can include generating new data elements and/or modifying existing elements.

S220 is preferably performed by adding perturbations (e.g., random perturbations) to the location measurements, geofence positions, geofence sizes, and/or any other suitable aspects of the data elements.

The new and/or modified elements generated in S220 are preferably labeled in S230 (e.g., wherein S230 is performed after S220, such as in response to S220). However, the modified elements can alternatively retain their prior labels (e.g., labels associated with the dataset received in S210), and/or can be associated with labels in any other suitable manner.

3.2.3 Labeling the Training Dataset.

S200 can optionally include labeling the training dataset S230. S230 is preferably performed if the training dataset received in S210 is not labeled (or only partially labeled, such as including one or more data elements that are not labeled), and/or performed if S220 was performed (e.g., wherein S230 functions to label new points generated in S220 and/or points modified by performance of S220).

In a first embodiment, S230 includes automatically labeling the training dataset (or a subset thereof) using an alternative classifier (e.g., classifier different than the classifier trained in S200). In a first example of this embodiment, the alternative classifier relies on additional information (e.g., information not necessarily available for performing S100, such as information not received in S110). For example, this information can include associations with users, customers, waste types, and/or any other suitable information (e.g., such as described above regarding S210). In a second example of this embodiment, the alternative classifier has higher computational requirements (e.g., requires more processor time and/or other computational resources) than the classifier to be trained in S200. However, the alternative classifier can additionally or alternatively include any other suitable computerized classifier.

In a second embodiment, S230 includes receiving labels from human classifiers. For example S230 can include presenting a location measurement and nearby geofences to one or more human classifiers (e.g., presented as a graphical representation of the location measurement and the geofences). In this embodiment, S230 can further include receiving a geofence selection, an indication of no assignment, and/or an indication of ambiguity from the human classifiers, and preferably includes labeling the location measurement based on the information received from the human classifiers.

However S230 can additionally or alternatively include labeling the training dataset in any other suitable manner.

3.2.4 Generating the Classifier.

Generating the classifier S240 preferably functions to generate the trained computerized classifier (e.g., for use in S140). The classifier is preferably trained based on the labeled training data (e.g., training dataset received in S210, dataset modified in S220, and/or dataset labeled in S230), but can additionally or alternatively be trained based on any other suitable information. Training the classifier preferably includes determining features associated with the labeled training data (e.g., features such as described above regarding S130 and/or any other suitable features). S240 preferably includes training the classifier such as according to established techniques known in the art for training classifiers of the classifier type (e.g., using a random forest training algorithm to train a random forest classifier). However, S240 can additionally or alternatively include training a classifier in any other suitable manner.

However S200 and/or the method 10 can additionally or alternatively include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for location measurement analysis, comprising:
   receiving a location measurement indicative of a location in a space;
   receiving a set of geofences, each geofence of the set defining a respective position in the space and a respective shape;
   selecting, based on geofence proximity to the location, a plurality of candidate geofences from the set of geofences;
   determining a set of geofence geometry features associated with the location; and based on the set of geofence geometry features, assigning the location measurement to a selected geofence of the plurality of candidate geofences;

wherein:

for each candidate geofence of the plurality, the set of geofence geometry features comprises a respective inter-geofence distance metric representative of a distance between the geofence and a second geofence of the set;

the set of geofences consists of the plurality of candidate geofences and a set of non-candidate geofences, wherein the plurality of candidate geofences and the set of non-candidate geofences are disjoint;

the set of non-candidate geofences comprises the second geofence; and the method further comprises, based on proximity to the location, selecting the second geofence as a geofence to which the inter-geofence distance metrics are defined based on proximity to the location, wherein, of the non-candidate geofences of the set, the second geofence is closest to the location.

2. The method of claim 1, wherein, for each geofence of the set, geofence proximity to the location is determined based on an edge distance from the location to an edge of the geofence.

3. The method of claim 1, wherein selecting the plurality of candidate geofences is performed such that the candidate geofences of the plurality are the closest geofences of the set to the location.

4. The method of claim 1, wherein, for each candidate geofence of the plurality, the set of geofence geometry features further comprises a respective geofence-location distance metric indicative of a center distance from the location to a center of the respective candidate geofence.

5. The method of claim 1, wherein, for each candidate geofence of the plurality, the respective inter-geofence distance metric is representative of a center-center distance between a candidate geofence center and a second geofence center.

6. The method of claim 1, wherein, for each candidate geofence of the plurality, the set of geofence geometry features further comprises a respective derived feature determined based on:

a respective size metric defined by the respective candidate geofence; and a respective geofence-location distance metric.

7. The method of claim 6, wherein:

the respective shape of each candidate geofence of the plurality is circular and defines a respective radius; and for each candidate geofence of the plurality, the respective size metric is indicative of the respective radius.

8. The method of claim 6, wherein, for each candidate geofence of the plurality, the respective geofence-location distance metric is indicative of an edge distance from the location to an edge of the respective candidate geofence.

9. The method of claim 6, wherein, for each candidate geofence of the plurality, the respective derived feature is determined based on a ratio of the respective size metric to the respective geofence-location distance metric.

10. The method of claim 1, wherein assigning the location measurement comprises using a random forest classifier to select the selected geofence.

11. The method of claim 10, wherein the random forest classifier is a kernel random forest classifier.

12. The method of claim 1, further comprising:

receiving a second location measurement indicative of a second location in the space;

selecting, based on geofence proximity to the second location, a second plurality of candidate geofences from the set of geofences;

determining a second set of geofence geometry features associated with the second location; and classifying the second location measurement based on the second set of geofence geometry features.

13. The method of claim 12, wherein:

a set of classes comprises, for each candidate geofence of the plurality, a different class associated with the respective candidate geofence; and classifying the second location measurement comprises associating the second location measurement with a class selected from the set.

14. The method of claim 13, wherein the set of classes further comprises an unassigned class that is not associated with any geofence of the set.

15. The method of claim 12, wherein:

the plurality of candidate geofences comprises a first geofence and a second geofence;

assigning the location measurement comprises associating the location measurement with the first geofence; and classifying the second location measurement comprises associating the second location measurement with the second geofence.

16. The method of claim 15, wherein:

assigning the location measurement comprises using a random forest classifier; and classifying the second location measurement comprises using the random forest classifier.

17. The method of claim 1, wherein the location is associated with a container.

18. The method of claim 17, wherein the container is an intermodal freight container.

\* \* \* \* \*